United States Patent
Kakishima et al.

(10) Patent No.: US 9,743,348 B2
(45) Date of Patent: Aug. 22, 2017

(54) USER EQUIPMENT AND BASE STATION

(71) Applicant: NTT DOCOMO, INC., Tokyo (JP)

(72) Inventors: Yuichi Kakishima, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/125,537

(22) PCT Filed: Dec. 1, 2014

(86) PCT No.: PCT/JP2014/081700
§ 371 (c)(1),
(2) Date: Sep. 12, 2016

(87) PCT Pub. No.: WO2015/141071
PCT Pub. Date: Sep. 24, 2015

(65) Prior Publication Data
US 2017/0006539 A1  Jan. 5, 2017

(30) Foreign Application Priority Data

Mar. 20, 2014  (JP) .................................. 2014-059183

(51) Int. Cl.
*H04W 48/20* (2009.01)
*H04W 16/28* (2009.01)
(Continued)

(52) U.S. Cl.
CPC .......... *H04W 48/20* (2013.01); *H04B 7/0478* (2013.01); *H04B 7/0617* (2013.01);
(Continued)

(58) Field of Classification Search
CPC ... H04L 5/0048; H04L 5/0053; H04L 5/0035; H04L 27/2613; H04L 25/0226
(Continued)

(56) References Cited

U.S. PATENT DOCUMENTS

2008/0261623 A1  10/2008  Etemad et al.
2010/0246527 A1   9/2010  Montojo et al.
(Continued)

FOREIGN PATENT DOCUMENTS

EP  2493090 A2  8/2012
EP  2493090 A3  8/2015
(Continued)

OTHER PUBLICATIONS

International Search Report issued in PCT/JP2014/081700 mailed on Mar. 3, 2015 (2 pages).
(Continued)

*Primary Examiner* — Keith Ferguson
(74) *Attorney, Agent, or Firm* — Osha Liang LLP

(57) ABSTRACT

The present disclosure relates to techniques for implementing cell selection suitable for 3D MIMO. One aspect of the present invention relates to user equipment, comprising: a transmission and reception unit configured to receive a reference signal list including precoded reference signals transmitted from a camped base station and an adjacent base station; a measurement unit configured to measure reception quality of the respective precoded reference signals in the received reference signal list; and a beam selection unit configured to select a beam to communicate with the camped base station or the adjacent base station based on the measured reception quality and indicate the selected beam to the camped base station or the adjacent base station.

14 Claims, 4 Drawing Sheets

(51) Int. Cl.
  *H04W 36/08* (2009.01)
  *H04B 7/06* (2006.01)
  *H04L 5/00* (2006.01)
  *H04B 7/08* (2006.01)
  *H04B 7/04* (2017.01)

(52) U.S. Cl.
  CPC ......... *H04B 7/0639* (2013.01); *H04B 7/0695* (2013.01); *H04B 7/088* (2013.01); *H04L 5/0048* (2013.01); *H04W 16/28* (2013.01); *H04W 36/08* (2013.01); *H04B 7/0469* (2013.01)

(58) Field of Classification Search
  USPC ................ 455/525, 524, 509, 436–444, 455/432.1–432.2, 422.1, 403, 67.11, 455/426.2, 456.1–457; 370/328, 329, 370/338, 331, 332, 310, 252
  See application file for complete search history.

(56) References Cited

U.S. PATENT DOCUMENTS

| | | | | |
|---|---|---|---|---|
| 2011/0177823 | A1* | 7/2011 | Miao | H04B 7/155 455/450 |
| 2012/0287875 | A1 | 11/2012 | Kim et al. | |
| 2013/0235807 | A1* | 9/2013 | Lee | H04W 16/28 370/329 |
| 2013/0279403 | A1* | 10/2013 | Takaoka | H04L 5/0035 370/328 |
| 2014/0073329 | A1 | 3/2014 | Kang et al. | |
| 2014/0177601 | A1 | 6/2014 | Nishio et al. | |

FOREIGN PATENT DOCUMENTS

| | | |
|---|---|---|
| JP | 2010-525668 A | 7/2010 |
| JP | 2012-523171 A | 9/2012 |
| JP | 2013-229735 A | 11/2013 |
| WO | 2013/021531 A1 | 2/2013 |
| WO | 2013/048212 A2 | 4/2013 |

OTHER PUBLICATIONS

Written Opinion of the International Searching Authority issued in PCT/JP2014/081700 mailed on Mar. 3, 2015 (4 pages).
3GPP TS 36.211 V12.0.0; "3rd Generation Partnership Project; Technical Specification Group Radio Access Network; Evolved Universal Terrestrial Radio Access (E-UTRA); Physical channels and modulation (Release 12)"; Dec. 2013 (120 pages).
Partial Supplementary European Search Report issued in the counterpart European Patent Application No. 14885935.8, mailed Feb. 14, 2017 (8 pages).
Extended European Search Report dated Jun. 12, 2017, in corresponding European Application No. 14885935.8 (17 pages).

* cited by examiner

| TWO-DIMENSIONAL ARRANGEMENT OF UNIFORM POLARIZATION ELEMENTS (64 AP) | TWO-DIMENSIONAL ARRANGEMENT OF ORTHOGONAL POLARIZATION ELEMENTS (128 AP) | CASE WHERE MULTIPLE ELEMENT GROUP IS 1 AP (4 ELEMENTS CORRESPOND TO 2 AP) (32 AP) |
|---|---|---|
|  |  |  |

USER EQUIPMENT AND BASE STATION

TECHNICAL FIELD

The present invention relates to a radio communication system.

BACKGROUND ART

In Releases 8-11 of 3GPP (Third Generation Partnership Project), techniques for forming beams in the horizontal direction at a base station having multiple horizontally arranged antenna ports are employed. Also in Release 12, in order to further improve system characteristics, beam forming techniques (3D MIMO (Multiple-Input Multiple-Output)) for forming beams not only in the horizontal direction but also in the vertical direction at a base station having multiple antenna ports arranged two-dimensionally in the horizontal and vertical directions are being discussed.

In the 3D MIMO, a base station uses multiple antenna ports arranged two-dimensionally in the horizontal and vertical directions to form directional beams in the horizontal and vertical directions. As illustrated in FIG. 1, the base station transmits directional beams, that is, precoded signals from the respective antenna ports. In the illustrated example, the base station transmits precoded CSI-RSs (Channel State Information-Reference Signals) for reception quality measurement at user equipment as the precoded signals. The user equipment measures reception quality of the precoded CSI-RSs transmitted from the respective antenna ports, selects a directional beam having good reception quality (for example, a directional beam having the maximum reception power) based on the measured reception quality and feeds a beam index of the selected directional beam back to the base station.

As implementations of the 3D MIMO, vertical beam forming and FD (Full Dimension)-MIMO are known. In 3GPP specifications, the case where the number of transmission antenna ports is smaller than or equal to 8 is referred to as the vertical beam forming, and the case where the number of transmission antenna ports is greater than 8 (such as 16, 32 and 64) is referred to as the FD-MIMO. In the future, it is assumed that more than hundreds to ten thousands of antennas may be used (Massive MIMO or Higher-order MIMO), and it may be considered that antennas are arranged in three arbitrary directions in addition to the two-dimensional arrangement of the horizontal and vertical directions.

See 3GPP TS 36.211 V12.0.0 (2013-12) for details of the 3D MIMO, for example.

SUMMARY OF INVENTION

Problem to be Solved by the Invention

In conventional cell selection, user equipment selects a connecting base station based on reception quality of non-precoded cell reference signals (CRSs). For example, in the example as illustrated in FIG. 2, the user equipment will select the base station B of greater reception power of the CRSs from the cell selection candidate base stations A and B (eNB A and eNB B).

Meanwhile, the base station A can transmit data in signals precoded in the blowing up direction toward the user equipment, and if the precoded signals are applied to the user equipment, the user equipment could achieve higher reception quality than any of directional beams from the base station B. However, in the conventional CRS based cell selection, the user equipment would select not the base station A achieving higher reception quality but the base station B.

One object of the present invention is to provide techniques for implementing cell selection suitable for the 3D MIMO.

Means for Solving the Problem

In order to achieve the above object, one aspect of the present invention relates to user equipment, comprising: a transmission and reception unit configured to receive a reference signal list including precoded reference signals transmitted from a camped base station and an adjacent base station; a measurement unit configured to measure reception quality of the respective precoded reference signals in the received reference signal list; and a beam selection unit configured to select a beam to communicate with the camped base station or the adjacent base station based on the measured reception quality and indicate the selected beam to the camped base station or the adjacent base station.

Another aspect of the present invention relates to a base station where user equipment is camped, comprising: a transmission and reception unit configured to transmit a reference signal list including precoded reference signals transmitted from the base station and an adjacent base station and transmit the precoded reference signals; and a beam/cell switching unit configured to obtain feedback information indicative of a beam selected by the user equipment and perform a beam/cell switching operation corresponding to the selected beam.

Advantage of the Invention

According to the present invention, it is possible to provide techniques for implementing cell selection suitable for the 3D MIMO.

EMBODIMENTS OF THE INVENTION

Embodiments of the present invention are described below with reference to the drawings.

User equipment and a base station that can implement cell selection suitable for the 3D MIMO are disclosed. In embodiments as stated below, the user equipment receives a reference signal list including precoded reference signals transmitted from a camped base station and an adjacent base station and measures reception quality of the respective precoded reference signals in the received reference signal list. For example, the user equipment may measure RSRP (Reference Signal Received Power) of the respective precoded CSI-RSs transmitted from the camped base station and the adjacent base station. The user equipment selects a beam to communicate with the camped base station or the adjacent base station based on the measured reception quality and indicates the selected beam to the camped base station or the adjacent base station. Here, the camped base station may adjust a handover related parameter value configured for the user equipment to avoid frequent occurrence of beam selection accompanied with handover.

In this manner, the cell selection more suitable for the 3D MIMO using directional beams can be implemented compared to the conventional cell selection based on non-precoded reference signals.

Figure 1:
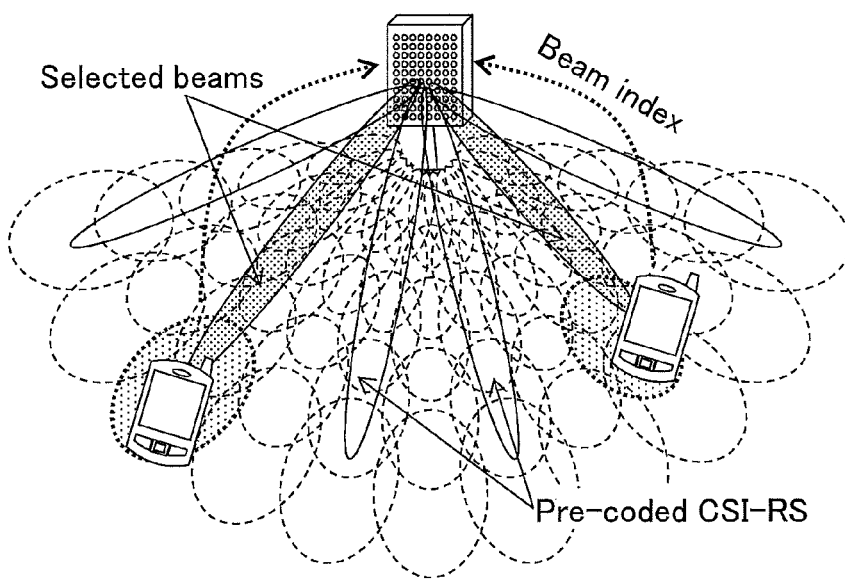
FIG. 1 is a schematic diagram for illustrating beam forming in the 3D MIMO.
Figure 2:
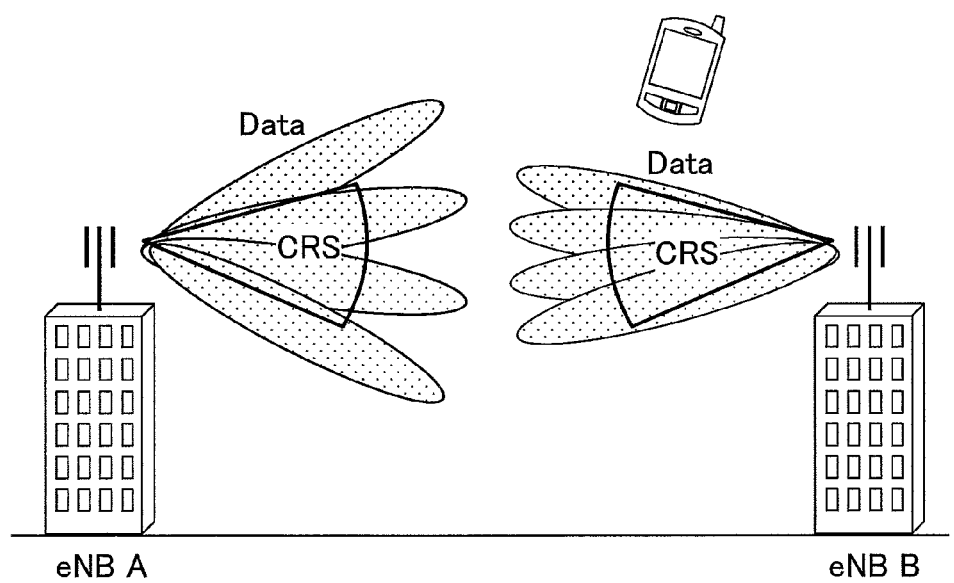
FIG. 2 is a schematic diagram for illustrating conventional cell selection.
Figure 3:
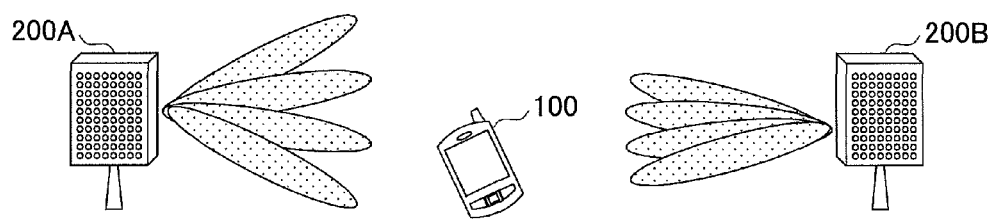
FIG. 3 is a schematic diagram for illustrating a radio communication system according to one embodiment of the present invention.

A radio communication system according to one embodiment of the present invention is described with reference to FIG. 3. The radio communication system according to embodiments as stated below supports 3D MIMO communication. FIG. 3 is a schematic diagram for illustrating a radio communication system according to one embodiment of the present invention.

As illustrated in FIG. 3, the radio communication system 10 has user equipment (UE) 100 and base stations (eNBs) 200A, 200B (collectively referred to as the base stations 200). In the illustrated embodiment, the radio communication system 10 has only the single user equipment 100 and the two base stations 200A, 200B, but it typically has a large number of user equipments 100 and a large number of base stations 200. Specifically, the large number of base stations 200 are disposed to cover a service area of the radio communication system 10, and the respective user equipments 100 communicatively connect for any of the base stations 200 and perform MIMO communication with the connecting base stations 200. In the illustrated embodiment, the user equipment 100 is camped in a cell of the base station 200A and performs the MIMO communication with the base station 200A. Also, the base station 200B is disposed adjacently to the base station 200A, and the base stations 200A, 200B are communicatively connected to each other via a backhaul. Here, the base stations 200A, 200B may be composed of a single eNB (evolved Node B) and two RRHs (Remote Radio Heads) or two stand-alone eNBs.

The user equipment 100 uses the 3D MIMO to communicate with the base station 200. The user equipment 100 is typically a mobile phone, a smartphone, a tablet, a mobile router or the like, but is not limited to it, may be any appropriate user equipment with a radio communication function. In a typical hardware arrangement, the user equipment 100 has a CPU (Central Processing Unit) such as a processor, a memory device such as a RAM (Random Access Memory), an auxiliary storage device such as a hard disk device, a communication device for communicating radio signals, an interface device for interfacing with users, and so on. Functions of the user equipment 100 as stated below may be implemented by the CPU loading data and programs stored in the auxiliary storage device via the communication device and/or the interface device into the memory device and processing the data in accordance with the loaded programs.

Figure 4:
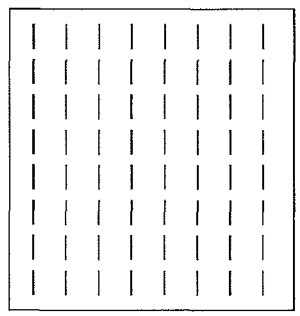
FIG. 4 is a schematic diagram for illustrating exemplary arrangements of antenna elements in a base station according to one embodiment of the present invention.
Figure 4:
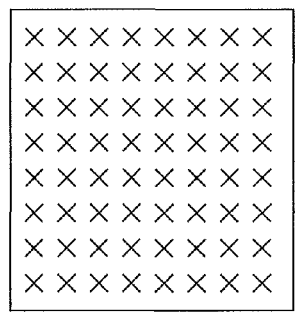
Figure 4:
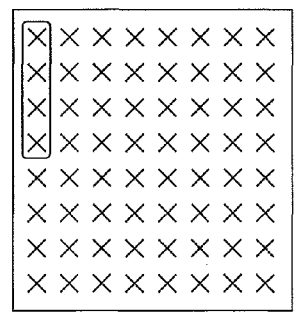

The base station 200 uses the 3D MIMO to communicate with the user equipment 100. In the illustrated embodiment, the base station 200A is a camped base station of the user equipment 100, and the base station 200B is an adjacent base station disposed adjacently to the camped base station 200A. The base station 200 uses multiple antenna ports arranged in a predetermined beam arrangement to form directional beams. For example, as illustrated in FIG. 4, the base station 200 uses multiple antenna ports two-dimensionally arranged in the horizontal and vertical directions to form directional beams in the horizontal and vertical directions. These antenna ports (APs) may be composed of antenna elements using uniform polarization elements or orthogonal polarization elements. For example, in the left side illustration in FIG. 4, the uniform polarization elements are two-dimensionally arranged as illustrated, and 64 antenna ports are formed. Also in the middle illustration in FIG. 4, orthogonal polarization elements are two-dimensionally arranged as illustrated, and 128 antenna ports are formed. Furthermore, in the right side illustration in FIG. 4, orthogonal polarization elements are two-dimensionally arranged as illustrated, and one antenna port is formed of multiple elements. The base station 200 is not limited to the illustrated antenna element arrangements, and any appropriate antenna element arrangement that can form multiple directional beams to cover a cell of the base station 200 by using multiple antenna ports may be used. For example, the antenna elements may be arranged in either the horizontal direction or the vertical direction.

The camped base station 200A transmits various signals, such as data signals and control signals, to the user equipment 100 in directional beams from respective antenna ports and receives various signals, such as data signals and control signals, from the user equipment 100 via the antenna ports. In the 3D MIMO, in order to improve data transmission efficiency, the base station 200A uses an appropriate directional beam corresponding to the position of the user equipment 100 to transmit signals to the user equipment 100. In order to determine a directional beam suitable for the user equipment 100, the base station 200A transmits precoded references signals for reception quality measurement at the user equipment 100 by transmitting directional beams from the respective antenna ports. On the other hand, the adjacent base station 200B also transmits precoded reference signals in cooperation with the camped base station 200A.

In one embodiment, the base stations 200A, 200B transmit precoded CSI-RSs (Channel State Information-Reference Signals) as the precoded reference signals for reception quality measurement. In general, a precoded signal increases beam gain but narrows a beam width. Accordingly, a number of beam directions almost proportional to the number of antenna elements are required for omnidirectional coverage of the base stations 200A, 200B (for example, twice the number of beam directions compared to the number of antenna elements), and if a large number of antenna elements are used, it is necessary to form a large number of directional beams or precoded reference signals.

The user equipment 100 measures reception quality of the precoded CSI-RSs transmitted from the respective antenna ports in the base stations 200A, 200B and selects a directional beam having good reception quality based on the measured reception quality. Note that the reference signal transmitted in a directional beam is not limited to the CSI-RS and may be a PSS (Primary Synchronization Signal), a SSS (Secondary Synchronization Signal), an Enhanced SS, a Discovery signal, a DM-RS (Data Demodulation-Reference Signal) or the like.

In one embodiment, for example, the user equipment 100 may select a directional beam having the maximum reception power or the best SINR. The user equipment 100 feeds a beam index of the selected directional beam back to the camped base station 200A. Here, the beam indices of the respective directional beams are indicated from the camped base station 200A and are associated with timings and/or frequencies for transmitting the respective directional beams, for example. Upon receiving the feedback information, the camped base station 200A applies the indicated directional beam to the user equipment 100 if the indicated beam index corresponds to the directional beam of the camped base station 200A. On the other hand, if the indicated beam index corresponds to the directional beam of the adjacent base station 200B, the camped base station 200A initiates a handover operation to the adjacent base station 200B.

Figure 5:
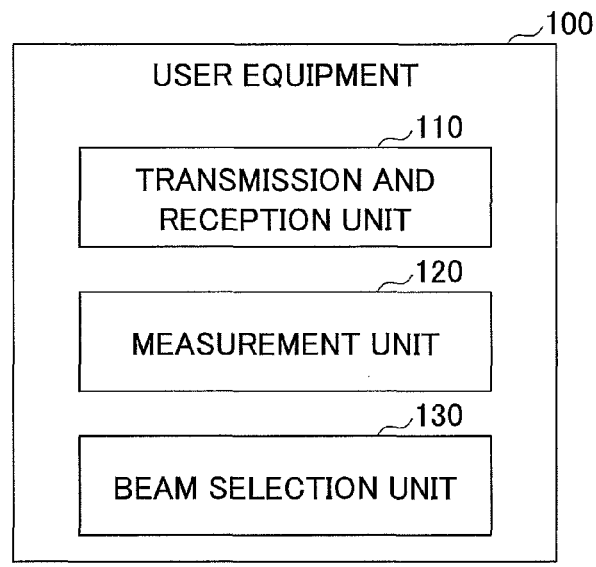
FIG. 5 is a block diagram for illustrating an arrangement of user equipment according to one embodiment of the present invention.

Next, the user equipment according to one embodiment of the present invention is described with reference to FIG. 5. FIG. 5 is a block diagram for illustrating an arrangement of the user equipment according to one embodiment of the present invention.

As illustrated in FIG. 5, the user equipment 100 has a transmission and reception unit 110, a measurement unit 120 and a beam selection unit 130. As stated above in conjunction with FIG. 3, the user equipment 100 is camped in the base station 200A.

The transmission and reception unit 110 receives a reference signal list including precoded reference signals transmitted from the camped base station 200A and the adjacent base station 200B. In one embodiment, the transmission and reception unit 110 receives a list of multiple precoded CSI-RSs for beam/cell selection by the user equipment 100 from the camped base station 200A. The indicated precoded CSI-RS list includes a precoded CSI-RS transmitted in a directional beam from the camped base station 200A and a precoded CSI-RS transmitted in a directional beam from the adjacent base station 200B.

In one embodiment, the respective precoded reference signals in the reference signal list may be associated with cell indices indicative of base stations transmitting the precoded reference signals. For example, if the cell indices are added to the precoded CSI-RS list, the user equipment 100 can determine based on the cell indices whether the beam selection in the precoded CSI-RS list has to be made through a beam switching operation in the camped base station 200A or through a handover operation to the adjacent base station 200B.

Also in one embodiment, the respective precoded reference signals in the reference signal list may be associated with collocation information indicative of areas for transmitting the reference signals. The collocation information indicates positions of coverage areas of directional beams for use in transmitting the respective reference signals in the reference signal list. Particularly, if beams are selected from multiple cells, the precoded reference signals from the respective cells can be synchronized based on the collocation information. Specifically, the distance between the user equipment 100 and the camped base station 200A may be generally different from the distance between the user equipment 100 and the adjacent base station 200B, and respective reception timings at the user equipment 100 may be different. Accordingly, by using the collocation information to compensate for a propagation time difference of directional beams between the camped base station 200A and the adjacent base station 200B, the user equipment 100 can determine reception timings of the precoded reference signals transmitted from the camped base station 200A and the adjacent base station 200B, which can implement highly accurate beam identification.

The measurement unit 120 measures reception quality of the respective precoded reference signals in the received reference signal list. For example, the measurement unit 120 may measure the RSRP of the respective precoded CSI-RSs in the precoded CSI-RS list indicated from the camped base station 200A. The measurement unit 120 provides the beam selection unit 130 with the reception quality measured for the respective precoded reference signals.

In one embodiment, as stated above, if the respective precoded reference signals in the reference signal list are associated with the collocation information, the measurement unit 120 may estimate the position of the user equipment 100 based on the measured reception quality and the collocation information. For example, the measurement unit 120 may estimate a position in the collocation information associated with the reference signal having the maximum reception quality as the position of the user equipment 100.

In one embodiment, the measurement unit 120 may further measure reception quality of respective non-precoded reference signals transmitted from the camped base station 200A and the adjacent base station 200B. For example, the measurement unit 120 may measure reception power of cell reference signals (CRSs) transmitted from the camped base station 200A and the adjacent base station 200B and supply the measured reception power to the beam selection unit 130. As a result, the beam selection unit 130 can determine which beam should be applied based on combination of the reception quality of the precoded CSI-RSs and the reception quality of the CRSs.

The beam selection unit 130 selects a beam to communicate with the camped base station 200A or the adjacent base station 200B based on the measured reception quality and indicates the selected beam to the camped base station 200A or the adjacent base station 200B. Specifically, if the selected beam is transmitted from the camped base station 200A, the beam selection unit 130 indicates the beam index of the selected beam to the camped base station 200A. On the other hand, if the selected beam is transmitted from the adjacent base station 200B, the beam selection unit 130 transmits a handover request for activating a handover operation to the camped base station 200A and the adjacent base station 200B and indicates the selected beam to the adjacent base station 200B in the handover operation.

In one embodiment, the beam selection unit 130 may select a beam having the maximum reception quality. Specifically, the beam selection unit 130 may select a beam having the maximum reception power (RSRP) in reception power measured for the precoded CSI-RSs. Alternatively, the beam selection unit 130 may perform a statistical operation on the measured reception quality and select a beam based on a result of the statistical operation. In order to avoid frequent handover, for example, the beam selection unit 130 may calculate an average of the RSRP of the precoded CSI-RSs transmitted from the camped base station 200A and an average of the RSRP of the precoded CSI-RSs transmitted from the adjacent base station 200B and select a beam having the maximum reception power in a cell having a better one of the averages. Alternatively, the beam selection unit 130 may identify a predefined number of beams of higher reception power and select a beam having the maximum reception power in a cell including more of the identified beams.

In one embodiment, if the respective precoded reference signals in the reference signal list are associated with cell indices, the beam selection unit 130 may select a beam to communicate with the camped base station 200A or the adjacent base station 200B based on the measured reception quality as well as which of the camped base station 200A or the adjacent base station 200B is the transmitting base station identified by the cell index. As stated above, if the beam selection unit 130 selects a directional beam of the adjacent base station 200B, the user equipment 100 has to perform a handover operation. Higher workload is required for the handover operation than for a beam switching operation in the camped base station 200A, and thus it is necessary to avoid frequent handover. Accordingly, the beam selection accompanied with the handover and the beam selection not accompanied with the handover may be determined based on different criteria.

In one embodiment, if the measurement unit 120 measures reception quality of respective non-precoded reference signals transmitted from the camped base station 200A and the adjacent base station 200B together with the precoded reference signals, the beam selection unit 130 may select a beam to communicate with the camped base station 200A or the adjacent base station 200B based on the measured reception quality of the precoded reference signals and the measured reception quality of the non-precoded reference signals. In other words, the beam selection unit 130 may combine the reception quality of the precoded CSI-RSs with the reception quality of the CRSs for the beam selection. For example, the beam selection unit 130 may select a cell based on the reception quality of the CRSs at the first stage, select beams based on the reception quality of the precoded CSI-RSs at the second stage and finally select a beam based on the cell selected at the first stage and the beams selected at the second stage.

Figure 6:
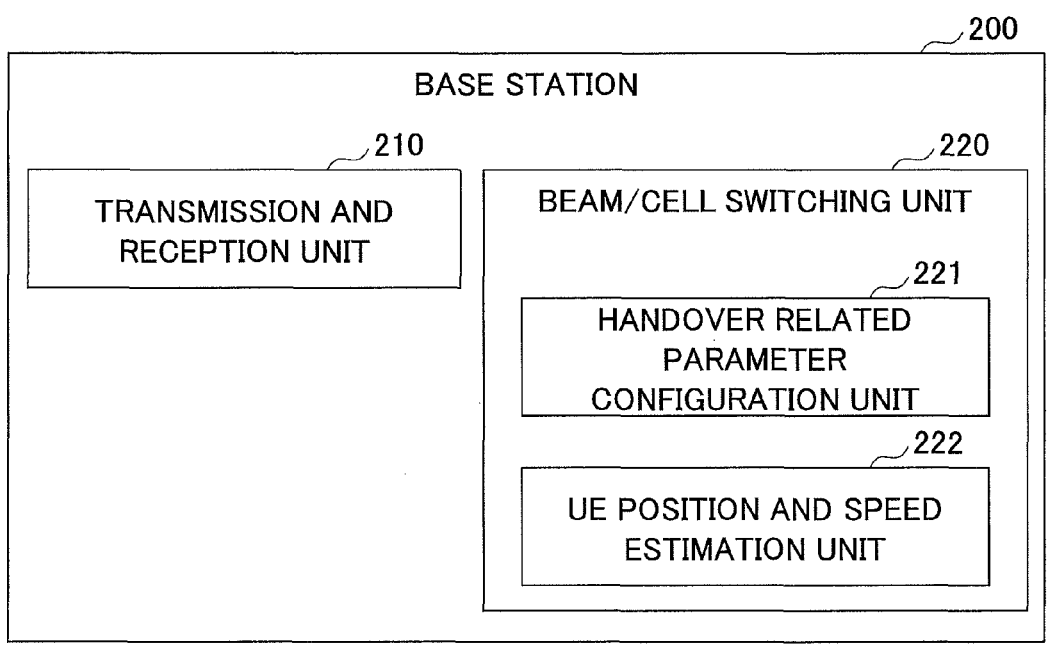
FIG. 6 is a block diagram for illustrating an arrangement of a base station according to one embodiment of the present invention.

Next, a base station according to one embodiment of the present invention is described with reference to FIG. 6. In this embodiment, the base station 200 is mainly described from the standpoint of the camped base station 200A, but the description below of the base station 200 can be similarly applied to the adjacent base station 200B. FIG. 6 is a block diagram for illustrating an arrangement of the base station according to one embodiment of the present invention.

As illustrated in FIG. 6, the base station 200 has a transmission and reception unit 210 and a beam/cell switching unit 220.

The transmission and reception unit 210 transmits a reference signal list including precoded reference signals transmitted from the camped base station 200A and the adjacent base station 200B and transmits the precoded reference signals. Specifically, the transmission and reception unit 210 transmits the precoded CSI-RS list for precoded CSI-RSs transmitted from the camped base station 200A and the adjacent base station 200B to the user equipment 100 and transmits the respective precoded CSI-RSs in the precoded CSI-RS list. In order to generate the precoded CSI-RS list, the camped base station 200A requests the adjacent base station 200B to indicate directional beams of the adjacent base station 200B that may be selected by the user equipment 100 and receives a list of beam selection candidates from the adjacent base station 200B. For example, the adjacent base station 200B may indicate directional beams transmitted toward the camped base station 200A as the beam selection candidates to the camped base station 200A. Alternatively, if the adjacent base station 200B obtains positional information of the user equipment 100 from the camped base station 200A, the adjacent base station 200B may indicate directional beams transmitted toward the user equipment 100 as the beam selection candidates to the camped base station 200A. The transmission and reception unit 210 indicates the reference signal list composed of the beam selection candidates received from the adjacent base station 200B and directional beams transmitted from the transmission and reception unit 210 to the user equipment 100.

In one embodiment, the respective precoded reference signals in the reference signal list may be associated with cell indices indicative of the base stations 200 transmitting the precoded reference signals. Also, the respective precoded reference signals in the reference signal list may be associated with collocation information indicative of areas for transmitting the reference signals.

The beam/cell switching unit 220 obtains feedback information indicative of a beam selected by the user equipment 100 and performs a beam/cell switching operation corresponding to the selected beam. Specifically, for the precoded reference signals transmitted from the camped base station 200A and the adjacent base station 200B, the user equipment 100 selects a beam to communicate with the camped base station 200A or the adjacent base station 200B and feeds the beam index of the selected beam back to the camped base station 200A. The beam/cell switching unit 220 performs a beam switching operation in the camped base station 200A or a cell switching operation (handover operation) to the adjacent base station 200B based on the feedback information received from the user equipment 100.

In one embodiment, the beam/cell switching unit 220 has a handover related parameter configuration unit 221 and a UE position and speed estimation unit 222.

The handover related parameter configuration unit 221 configures a handover related parameter including at least one of a hysteresis, a temporal forgetting factor and a Time to Trigger. Here, the hysteresis is a margin of reception quality provided for handover determination by the user equipment 100 to avoid a ping-pong operation at the cell boundary. Also, the temporal forgetting factor is a forgetting factor referred to as L3 filtering for use in temporal averaging operations by the user equipment 100 to remove influence of fast fading. Also, the Time to Trigger is a temporal margin provided for handover determination by the user equipment 100 to avoid the ping-pong operations. The hysteresis, the temporal forgetting factor and the Time to Trigger are handover related parameters well-known to those skilled in the art, and further detailed description thereof is omitted here.

The transmission and reception unit 210 indicates the handover related parameter to the user equipment 100 to cause the user equipment 100 to select a beam of the adjacent base station 200B in accordance with the configured handover related parameter. In beam/cell selection based on the precoded reference signals, the reference signals are transmitted in directional beams having small beam widths compared to the cell selection based on no-precoded reference signals, and accordingly reception quality of the precoded reference signals may vary instantaneously. For this reason, according to the beam/cell selection based on the precoded reference signals, the handover may occur frequently, which may increase the system workload. Accordingly, the handover related parameter configuration unit 221 configures the handover related parameter value for the user equipment 100 to avoid frequent occurrence of the handover.

In one embodiment, the handover related parameter configuration unit 221 may configure different values for the handover related parameter depending on whether the user equipment 100 applies the 3D MIMO. For example, in order to avoid the frequent occurrence of handover due to instantaneous variations of the precoded reference signals, the handover related parameter configuration unit 221 may configure a larger hysteresis, a smaller forgetting factor and/or a larger Time to Trigger for the 3D MIMO applied user equipment 100, compared to the handover related parameter configured for the 3D MIMO not-applied user equipment.

The transmission and reception unit 210 indicates the configured handover related parameter to the user equipment 100. For example, the camped base station 200A may predetermine multiple handover related parameter values specific to a cell and indicate the configured multiple cell specific handover related parameter values as broadcast information beforehand. When the handover related parameter configuration unit 221 selects one of the multiple handover related parameter values for the user equipment 100, the transmission and reception unit 210 may indicate an index indicative of the selected handover related parameter value to the user equipment 100 in an RRC (Radio Resource Control) message in a dedicated manner.

The UE position and speed estimation unit 222 estimates the position or speed of the user equipment 100 based on a beam selected by the user equipment 100. In one embodiment, the UE position and speed estimation unit 222 may estimate the position of the user equipment 100 based on a coverage area of the beam selected by the user equipment 100. Specifically, the UE position and speed estimation unit 222 can calculate a radiant direction of the beam selected by the user equipment 100 to estimate the geographical position of the coverage area of the beam. As a result, the UE position and speed estimation unit 222 can estimate the position of the user equipment 100. Here, the UE position and speed estimation unit 222 may estimate positions of coverage areas for respective directional beams beforehand, store the respective directional beams and the associated coverage areas in a table form and identify the coverage area corresponding to the beam selected by the user equipment 100 with reference to the table.

In one embodiment, the UE position and speed estimation unit 222 may estimate the speed of the user equipment 100 based on a beam switching frequency by the user equipment 100. Specifically, if the beam switching frequency or the number of beam switching times by the user equipment 100 is high or large, it can be estimated that the movement speed of the user equipment 100 may be high. On the other hand, if the beam switching frequency or the number of beam switching times by the user equipment 100 is low or small, it can be estimated that the user equipment 100 may not move so much.

Figure 7:
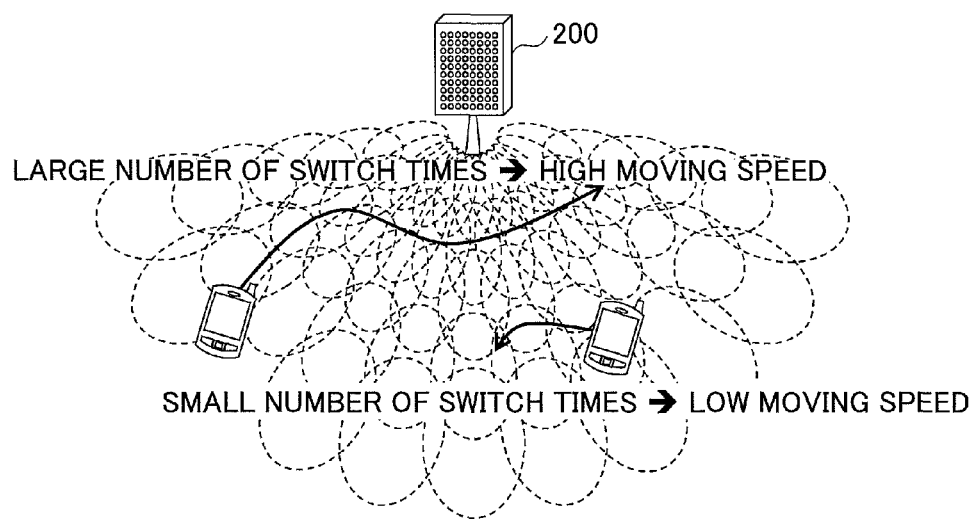
FIG. 7 is a schematic diagram for illustrating UE position and speed estimation according to one embodiment of the present invention.

As illustrated in FIG. 7, the coverage areas of the respective directional beams may have different sizes. Accordingly, the speed estimation can be achieved at a higher accuracy in consideration of the difference in sizes of the respective coverage areas rather than the above-stated straightforward speed estimation based on the beam switching frequency. For example, the number of beam switching times may be weighted corresponding to the sizes of coverage areas of the respective directional beams, and the speed of the user equipment 100 may be estimated based on the weighted number of beam switching times. Specifically, the UE position and speed estimation unit 222 may assign a relatively large weight for a directional beam having a relatively large coverage area and a relatively small weight for a directional beam having a relatively small coverage area. Also, the sizes of coverage areas of directional beams may be different in different cells. Accordingly, the UE position and speed estimation unit 222 may calculate the number of beam switching times with different weights for the different cells.

The camped base station 200A may use the estimated position and/or speed of the user equipment 100 to control communication with the user equipment 100. For example, the camped base station 200A may perform various control operations based on the estimated position of the user equipment 100, for example, identifying the most adjacent base station 200B to the user equipment 100 of multiple adjacent base stations to the camped base station 200A, configuring the handover related parameter, applying to a CoMP (Coordinated Multipoint) operation, cooperating with an upper layer such as usage of positional information in smartphone applications or the like. Also, the camped base station 200A may perform various control operations based on the estimated speed of the user equipment 100, for example, preventing the user equipment having high mobility from connecting to a small cell, changing the handover related parameter, changing a channel estimation method, preventing closed-loop type control from being used for the user equipment having high mobility, using a wide beam, cooperating with an upper layer such as usage of speed information in smartphone applications. In one embodiment, the transmission and reception unit 210 may selectively apply a wide beam and a narrow beam to the user equipment 100 depending on the estimated speed of the user equipment 100.

Also, the UE position and speed estimation unit 222 may estimate the position and/or speed of the user equipment 100 by estimating an incoming direction of an uplink signal transmitted from the user equipment 100. For example, the UE position and speed estimation unit 222 may estimate the position and/or speed of the user equipment 100 by estimating the incoming direction of an uplink signal received by the transmission and reception unit 210 such as a SRS (Sounding Reference Signal), a DM-RS (Data Demodulation-Reference Signal), a PRACH (Physical Random Access Channel) or the like.

Also, the UE position and speed estimation unit 222 may estimate the position and/or speed of the user equipment 100 two-dimensionally based on a two-dimensional antenna arrangement at the base station 200. Also, the UE position and speed estimation unit 222 may cooperate with the adjacent base station 200B to improve estimation accuracy. For example, the multiple base stations 200 perform angular estimation for the user equipment 100, and the position and/or speed of the user equipment 100 may be estimated by finding a cross point from the measured multiple angles. Alternatively, antennas of the base station 200 are three-dimensionally arranged, and the UE position and speed estimation unit 222 may estimate the position and/or speed of the user equipment 100 three-dimensionally. Note that the estimated speed may include not only velocity but also the travelling direction.

Also, the UE position and speed estimation unit 222 may combine map information (including height data), building information, GPS (Global Positioning System) information and/or positional information using WiFi with the estimated position and/or speed of the user equipment 100 so as to improve the estimation accuracy. Also, the UE position and speed estimation unit 222 may combine distance information between the base station 200 and the user equipment 100 measured based on propagation loss characteristics so as to improve the estimation accuracy.

Figure 8:
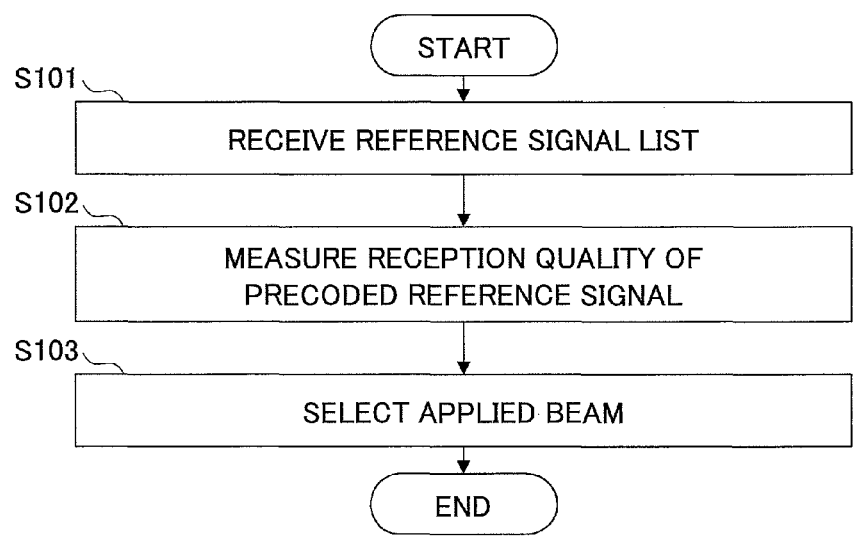
FIG. 8 is a flowchart for illustrating a beam selection operation by the user equipment according to one embodiment of the present invention.

Next, a beam selection operation by the user equipment according to one embodiment of the present invention is described with reference to FIG. 8. FIG. 8 is a flowchart for illustrating a beam selection operation according to one embodiment of the present invention.

As illustrated in FIG. 8, at step S101, the user equipment 100 receives a reference signal list including precoded reference signals transmitted from the camped base station 200A and the adjacent base station 200B. For example, the reference signal list may be a list of precoded CSI-RSs transmitted from the camped base station 200A and the adjacent base station 200B.

At step S102, the user equipment 100 measures reception quality of the respective precoded reference signals in the received reference signal list. For example, the user equipment 100 may measure RSRP of the respective precoded CSI-RSs transmitted from the camped base station 200A and the adjacent base station 200B.

At step S103, the user equipment 100 selects a beam to communicate with the camped base station 200A or the adjacent base station 200B based on the measured reception quality and indicates the selected beam to the camped base station 200A or the adjacent base station 200B. For example, the camped base station 200A may configure different handover related parameter values for the user equipment 100 depending on whether the user equipment 100 applies the 3D MIMO. Specifically, in the 3D MIMO where the RSRP of precoded CSI-RSs may vary instantaneously, the camped base station 200A may configure the handover related parameter to avoid frequent occurrence of beam selection accompanied with handover and indicate the configured handover related parameter to the user equipment 100.

Although the embodiments of the present invention have been described in detail, the present invention is not limited to the above-stated specific embodiments, and various modifications and variations can be made within the spirit of the present invention as recited in claims.

This international patent application claims benefit of priority based on Japanese Priority Application No. 2014-059183 filed on Mar. 20, 2014, the entire contents of which are hereby incorporated by reference.

LIST OF REFERENCE SYMBOLS

10: radio communication system
100: user equipment
200A: camped base station
200B: adjacent base station

The invention claimed is:

1. User equipment, comprising:
a transmission and reception unit configured to receive a reference signal list, wherein the reference signal list specifies precoded reference signals transmitted from a camped base station and an adjacent base station;
a measurement unit configured to measure reception quality of the respective preceded reference signals specified in the received reference signal list; and
a beam selection unit configured to select a beam to communicate with the camped base station or the adjacent base station based on the measured reception quality, and indicate the selected beam to the camped base station or the adjacent base station.

2. The user equipment as claimed in claim 1, wherein the respective preceded reference signals in the reference signal list are associated with cell indices indicative of base stations transmitting the precoded reference signals, and the beam selection unit selects the beam to communicate with the camped base station or the adjacent base station based on the measured reception quality as well as which of the camped base station or the adjacent base station is the transmitting base station.

3. The user equipment as claimed in claim 1, wherein the respective preceded reference signals in the reference signal list are associated with collocation information indicative of areas for transmitting the reference signals, and the measurement unit estimates a position of the user equipment based on the measured reception quality and the collocation information.

4. User equipment, comprising:
a transmission and reception unit configured to receive a reference signal list, wherein the reference signal list specifies precoded reference signals transmitted from a camped base station and an adjacent base station;
a measure unit configured to:
measure reception quality of the respective precoded reference signals specified in the received reference signal list,
measure reception quality of respective non-precoded reference signals transmitted from the camped base station and the adjacent base station; and
a beam selection unit configured to:
select a beam to communicate with the camped base station or the adjacent base station based on the measured reception quality of the preceded reference signals and the measured reception quality of the non precoded reference signals. and
indicate the selected beam to the camped base station or the adjacent base station.

5. The user equipment as claimed in claim 4, wherein the respective preceded reference signals in the reference signal list are associated with cell indices indicative of base stations transmitting the precoded reference signals, and the beam selection unit selects the beam to communicate with the camped base station or the adjacent base station based on the measured reception quality as well as which of the camped base station or the adjacent base station is the transmitting base station.

6. The user equipment as claimed in claim 4, wherein the respective preceded reference signals in the reference signal list are associated with collocation information indicative of areas for transmitting the reference signals, and the measurement unit estimates a position of the user equipment based on the measured reception quality and the collocation information.

7. A base station where user equipment is camped, comprising:
a transmission and reception unit configured to:
transmit a reference signal list, wherein the reference signal list specifies precoded reference signals transmitted from the base station and an adjacent base station, and
transmit the precoded reference signals of the base station; and
a beam/cell switching unit configured to obtain feedback information indicative of a beam selected by the user equipment and perform a beam/cell switching operation corresponding to the selected beam.

8. The base station as claimed in claim 7, wherein the beam/cell switching unit has a handover related parameter configuration unit configured to configure a handover related parameter including at least one of a hysteresis, a temporal forgetting factor and a Time to Trigger, and the transmission and reception unit indicates the handover related parameter to the user equipment to cause the user equipment to select a beam of the adjacent base station in accordance with the configured handover related parameter.

9. The base station as claimed in claim 8, wherein the handover related parameter configuration unit configures different values for the handover related parameter depending on whether the user equipment applies 3D MIMO.

10. A base station where user equipment is camped, comprising:
a transmission and reception unit configured to;
transmit a reference signal list including preceded reference signals transmitted from the base station and an adjacent base station, and
transmit the precoded reference signals of the base station; and
a beam/cell switching unit configured to obtain feedback information indicative of a beam selected by the user equipment and perform a beam/cell switching operation corresponding to the selected beam,
wherein the beam/cell switching unit further comprises:
a UE position and speed estimation unit configured to estimate a position or speed of the user equipment based on the beam selected by the user equipment.

11. The base station as claimed in claim 10, wherein the UE position and speed estimation unit estimates the position of the user equipment based on a coverage area of the beam selected by the user equipment and the speed of the user equipment based on a beam switching frequency by the user equipment.

12. The base station as claimed in claim 10, wherein the transmission and reception unit selectively applies a wide beam and a narrow beam to the user equipment depending on the speed of the user equipment estimated by the UE position and speed estimation unit.

13. The base station as claimed in claim 10, wherein the beam/cell switching unit has a handover related parameter configuration unit configured to configure a handover related parameter including at least one of a hysteresis, a temporal forgetting factor and a Time to Trigger, and the transmission and reception unit indicates the handover related parameter to the user equipment to cause the user equipment to select a beam of the adjacent base station in accordance with the configured handover related parameter.

14. The base station as claimed in claim 13, wherein the handover related parameter configuration unit configures different values for the handover related parameter depending on whether the user equipment applies 3D MIMO.

* * * * *